United States Patent
Östergaard

[11] Patent Number: 5,807,027
[45] Date of Patent: Sep. 15, 1998

[54] CONNECTION SYSTEM FOR SUBSEA PIPELINES

[75] Inventor: Inge Östergaard, Heggedal, Norway

[73] Assignee: ABB Offshore Technology AS, Billingstad, Norway

[21] Appl. No.: 737,122

[22] PCT Filed: May 5, 1995

[86] PCT No.: PCT/NO95/00073

§ 371 Date: Dec. 23, 1996

§ 102(e) Date: Dec. 23, 1996

[87] PCT Pub. No.: WO95/30853

PCT Pub. Date: Nov. 16, 1995

[30] Foreign Application Priority Data

May 6, 1994 [NO] Norway .................................. 94.1688

[51] Int. Cl.⁶ .................................. F16L 1/12; E21B 7/12
[52] U.S. Cl. .................... 405/170; 405/169; 405/171; 166/343; 166/342; 166/341; 166/338
[58] Field of Search ........................ 405/169, 170, 405/171; 166/338, 339, 341, 342, 343

[56] References Cited

U.S. PATENT DOCUMENTS

| | | |
|---|---|---|
| 3,592,014 | 7/1971 | Brown . |
| 3,795,115 | 3/1974 | Bergquist et al. ...................... 405/170 |
| 4,019,334 | 4/1977 | Sinclair et al. . |
| 4,080,025 | 3/1978 | Garnier et al. ........................... 166/343 |
| 4,086,778 | 5/1978 | Latham et al. ........................... 166/343 |
| 4,277,202 | 7/1981 | Archambaud et al. .................. 405/169 |
| 4,641,998 | 2/1987 | Baugh . |
| 5,018,903 | 5/1991 | O'Donnell et al. ..................... 405/170 |
| 5,033,907 | 7/1991 | O'Donnell et al. ..................... 405/158 |
| 5,318,384 | 6/1994 | Maloberti et al. ...................... 405/173 |
| 5,501,549 | 3/1996 | Breda et al. ............................. 405/169 |
| 5,730,551 | 3/1998 | Skeels et al. ............................ 405/170 |

FOREIGN PATENT DOCUMENTS

| | | |
|---|---|---|
| 2239314 | 2/1974 | Germany . |
| 149254 | 12/1983 | Norway . |
| 378112 | 7/1964 | Switzerland . |
| 430351 | 8/1967 | Switzerland . |
| 431208 | 8/1967 | Switzerland . |
| 656199 | 6/1986 | Switzerland . |
| 2038971 | 7/1980 | United Kingdom . |
| 2046859 | 11/1980 | United Kingdom . |

*Primary Examiner*—Tamara L. Graysay
*Assistant Examiner*—Gary S. Hartmann
*Attorney, Agent, or Firm*—Panitch Schwarze Jacobs & Nadel, P.C.

[57] ABSTRACT

The invention relates to a system for pull-in and interconnection of two pipelines in subsea position, whereof one first pipeline initially is freely suspended, while one second pipeline for instance is mounted on a bottom based manifold frame. The end section on the first pipeline is provided with a socket-like termination with a front end, which is provided with means (17) for coupling of the terminator (8) to complementary pipe coupling means (29) on the second pipeline (19). The terminator (8) is provided with a laterally directed, longitudinally shaped anchor element (10), and the manifold frame (22) is provided with receiving means (24) for receipt and fixation of the anchor element (10). The anchor element (10) and the receiving means (24) are such dimensioned and positioned that when the anchor element (10) is placed in position in the receiving means, the coupling means (17) of the terminator (8) will be positioned straight in front of the complementary coupling means (20) on the second pipeline (19).

17 Claims, 5 Drawing Sheets

CONNECTION SYSTEM FOR SUBSEA PIPELINES

The present invention relates in general to equipment and systems for establishing connection between subsea flowlines and pipelines. The invention is especially developed in connection with applications whereby one first pipeline is permanently or temporarily mounted on a sea bottom based manifold or template, and one second pipeline initially free and disconnected, for instance with the so-called "second end" resting on a sea bottom.

A principal object for the invention is to provide systems and constructions for "pull-in" of the free end of the second pipeline to the pipeline end mounted on a bottom based template in order to accomplish a time and cost saving technique and simultaneously providing a 100% pressure proof intercoupling of the pipelines. Such pipelines or flowlines are primarily used for transportation of petroleum products, such as oil and gas, frequently subjected to high pressures.

Many solutions for accomplishing such operations are known. Further to the various elements and equipment which form part of the connections, such as flange couplings, sockets, bolts, packings etc. which usually are or will be mounted on the termination of one or both pipelines, one utilizes frequently one or more special tools in order to accomplish the coupling. These operations are carried out by means of divers or by means of more or less remotely controlled robots with manipulating arms which are mounted on so-called ROVs (Remote Operated Vehicles). Due to the time factor, the costs and especially the expenses involved by use of divers, one attempts to develop equipment whereby the operations can be accomplished more quickly and with an extended use of tools which can be remotely operated either directly or via use of ROVs.

The present invention can be used in connection with various applications for connection of subsea pipelines, but is particularly useful in connection with tasks whereby one free pipeline section shall be coupled to a bottom based pipeline which for instance forms part of a manifold, and/or is mounted on a bottom based template in connection with a subsea production system.

In accordance with known technique, the freely suspended pipeline is being pulled via a mounted so-called terminator in to the pipeline mounted on the template, during which operation the terminator on the free pipeline is pulled or moved into a jig with equipment for positioning special tools in order to accomplish the connection between the opposed terminators on the pipelines.

Norwegian patent 149.254, UK patent application no. 2.038.971 and U.S. Pat. No. 4,641,998 are illustrative of the known are in this field.

A drawback of most known systems is that the template with the manifold supporting or forming part of the installed pipeline, is provided with frame parts or a jig which more or less circumscribes or straddles the end part of the pipeline end on the template, and thereby complicates the positioning of the coupling tools including the flange coupling, both in the case where the tools are operated by means of divers or by means of ROVs.

A further drawback or shortcoming of known systems is that the pulling equipment itself, utilized for transportation and pulling of the pipeline into the coupling jig on the template, to a smaller or larger degree must be connected and pulled into the jig and thereby complicates both the pulling operation and the use of temporarily mounted coupling tools, and finally, the removal of such tools.

The general object for the present invention is on this background to provide equipment and systems which can imply an increased efficiency of the entire pulling and coupling operation.

The present invention is thus related to a system for pull-in and intercoupling of two pipelines in subsea position, wherein one first pipeline for instance is mounted on a bottom based manifold frame or the like, while one second pipeline initially is freely suspended or has one end for instance positioned on the sea bottom, the outer or front ends of said first and said second pipelines provided with coupling means for providing a pressure and fluid tight coupling therebetween, said second pipeline connected to a hoisting and pulling means and provided with a terminator and an anchor element, in order to position said second pipeline in a receiving means on the bottom based manifold frame, in which position the front end of the second pipeline will be located straight in front of the coupling end of the first pipeline mounted in the manifold frame, and means for carrying out a relative axial movement between the first and the second pipeline in order to bring the pipeline ends together, and means to accomplish the fluid and pressure tight coupling therebetween, and the system in accordance with the invention is generally characterized in that the terminator on the second pipeline comprises an elongated member, constituting the end part of the second pipeline, and provided with said coupling means at the outer end, and a sleeve member circumscribing the terminator and providing axial displaceable support for the terminator, said sleeve member provided with a laterally extending anchor element, pivotally mounted on said sleeve member about a transverse axis therethrough, said anchor element connected to a hoisting and pulling cable, hoisting means such as a hoisting cable attached to the sleeve member on the terminator fixed to the end part of the pipeline and finally, a coupling tool unit which can be descended from the sea surface for temporary placement on the anchor element with a bias on the manifold above the coupling zone when the second pipeline is positioned in the manifold, operative to pulling the end of the first and second pipelines together and accomplish the pressure tight coupling therebetween.

In a preferred embodiment of the invention, the anchor element or so-called "mandril" is pivotally mounted on the terminator about a transverse axis, through the same.

In a further preferred embodiment, the mandril is provided with two mutually spaced forklike arms straddling the terminator and being pivotally connected on either side of the terminator housing.

In a preferred aspect of the invention, the terminator is connected to one first cable or line designated as the "hoisting" line which extends up to hoisting equipment, and a second cable or line, the so-called "pulling line", which is attached to the outer end of the mandril during the pull-in operation, which pulling line therefrom extends to a transfer element such as a pulley, which suitably is mounted in said receiving means in the manifold frame or template, from where the pulling line extends upwards to a hoisting or monitoring equipment connected to a ROV and/or a surface vessel.

In a preferred embodiment of the beforementioned aspect of the invention, the outer end of the pulling line is initially attached to a mounting tool serving as a guide for the pulling line, which mounting tool is provided with transfer means for the pulling line, making it possible to pull the end of the pulling line from the receiving means on the template out to the mandril on the terminator on the free pipeline, for instance located at a distance from the template.

The invention further includes other features and aspects which will appear from the following description with reference to the accompanying drawings, which illustrate some embodiments of the invention, and wherein:

FIG. 1a shows a somewhat schematic layout illustrating perspectively a submerged location of the freely suspended second pipeline, FIG. 1b illustrates in a similar perspective layout the system in accordance with the invention under an arbitrarily selected step during the pulling operation, FIG. 2 is a compiled, substantially laterally shown perspective view illustrating the finalizing step of the pulling operation, FIG. 3a is a substantially elevational view illustrating an ROV in perspective, in proximity to the second pipeline with the terminator resting on the sea bottom and the mandril supported by a buoyant body, FIG. 3b is an elevational view of the second pipeline in steps one through three of pull-in of the terminator to a manifold, with steps two and three shown in phantom.

Figure 5:
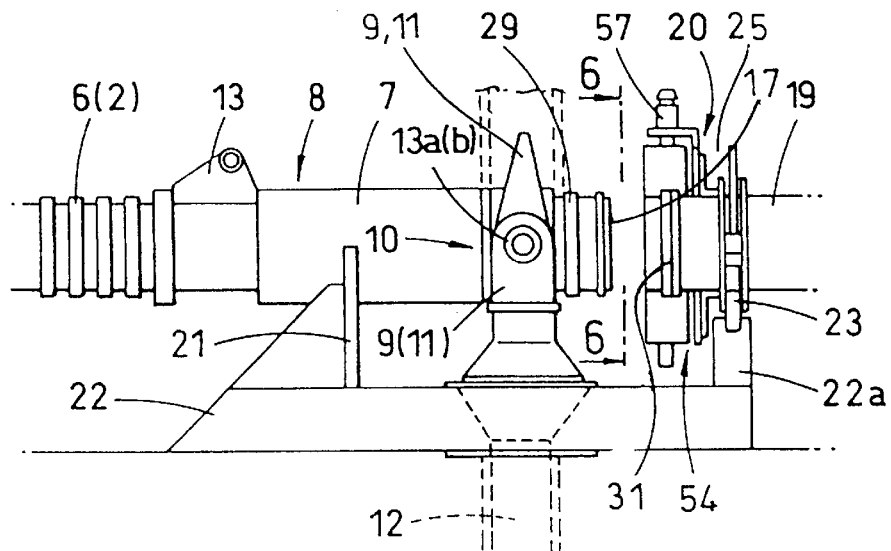
Figure 6:
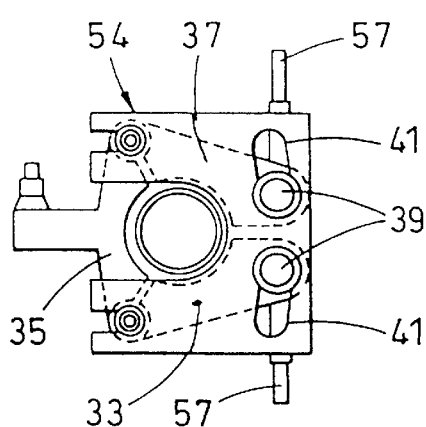
Figure 7:
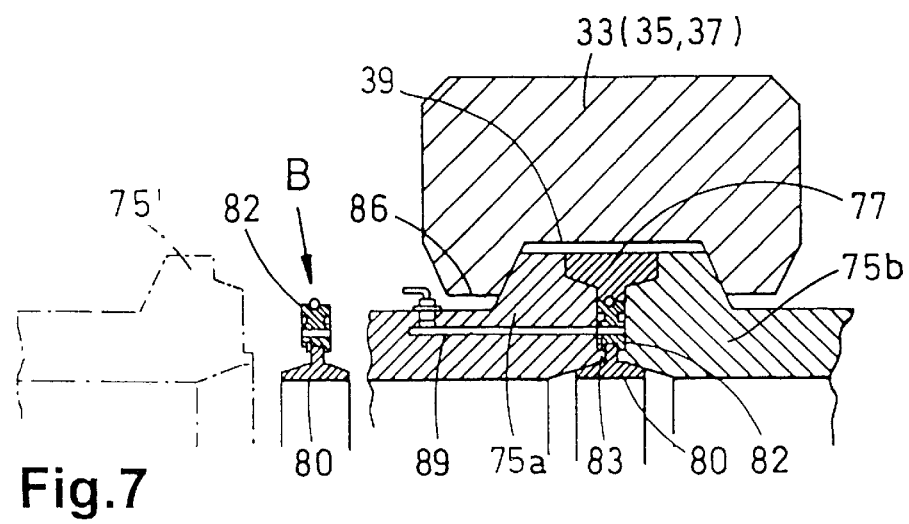

FIG. 5 is a lateral view showing the terminator with the anchoring element vertically positioned in the receiving means in the template, FIG. 6 is a vertical view along the plane 6—6 shown in FIG. 5 and illustrating the design of a special jack screw device, operable to clamp the first and second pipeline ends together in order to obtain a fluid and pressure tight coupling therebetween, FIG. 7 is an enlarged sectional view illustrating the construction of the pipeline ends including the special sealing means therebetween.

In all Figures, equal reference numerals are used on equal parts.

Figure 1A:
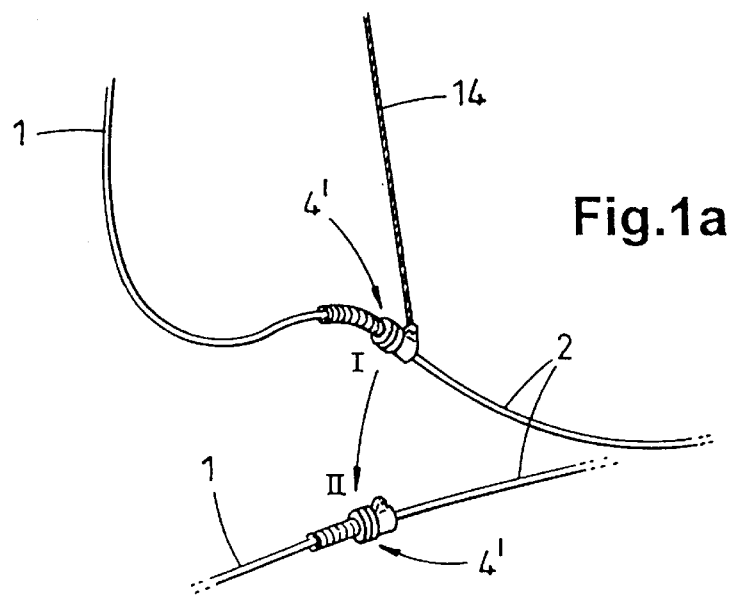
Figure 1B:
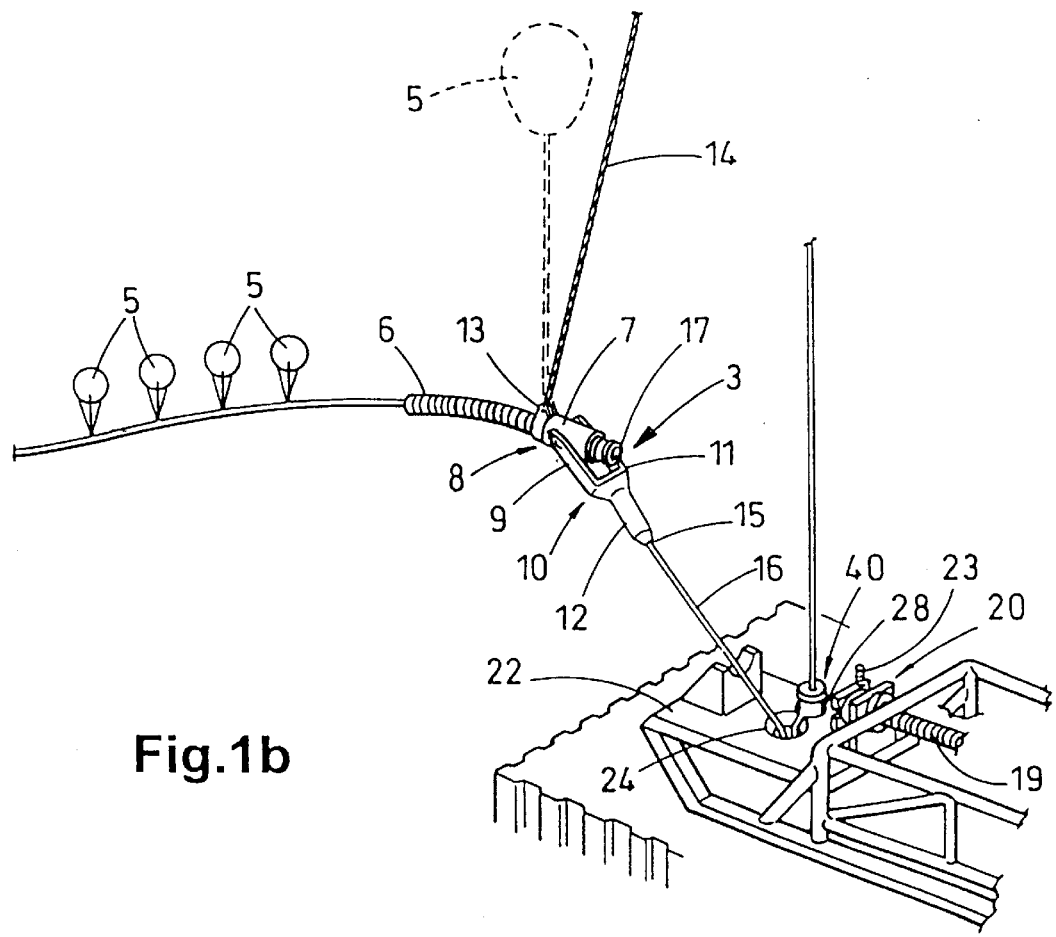

FIGS. 1a and b are perspective layouts illustrating the location of the second pipeline, the respective ends of which shall be connected, as shown in FIG. 1a, at a "first end" for instance to a flexible first pipeline at the coupling point 4'. The parts shown in FIG. 1a form no part of the present invention. The second end 3 of the second pipeline 2 as shown in FIG. 1b is in the shown embodiment enclosed and protected in a flexible casing 6 which at the outer end is connected to a so-called "terminator" 8, which shall be connected to a complementary coupling or terminator 20 on the first pipeline 19 which is mounted on a bottom based manifold frame or template 22. The first end of the second pipeline shown in FIG. 1a shall for instance be coupled to a surface vessel. However, alternatively also the so-called "first end" may be equipped with a special terminator in accordance with the invention, including a pivotable anchor element which shall be described in the following specification. In this alternative the equipment may be somewhat simplified, for instance not including the special pulling tool which shall be described in the following, since the pulling tool including a special pulling line may be unnecessary in connection with the coupling of the first end as long as the first end is being coupled to a complementary conveyor such as a bottom located pipeline.

Figure 3B:
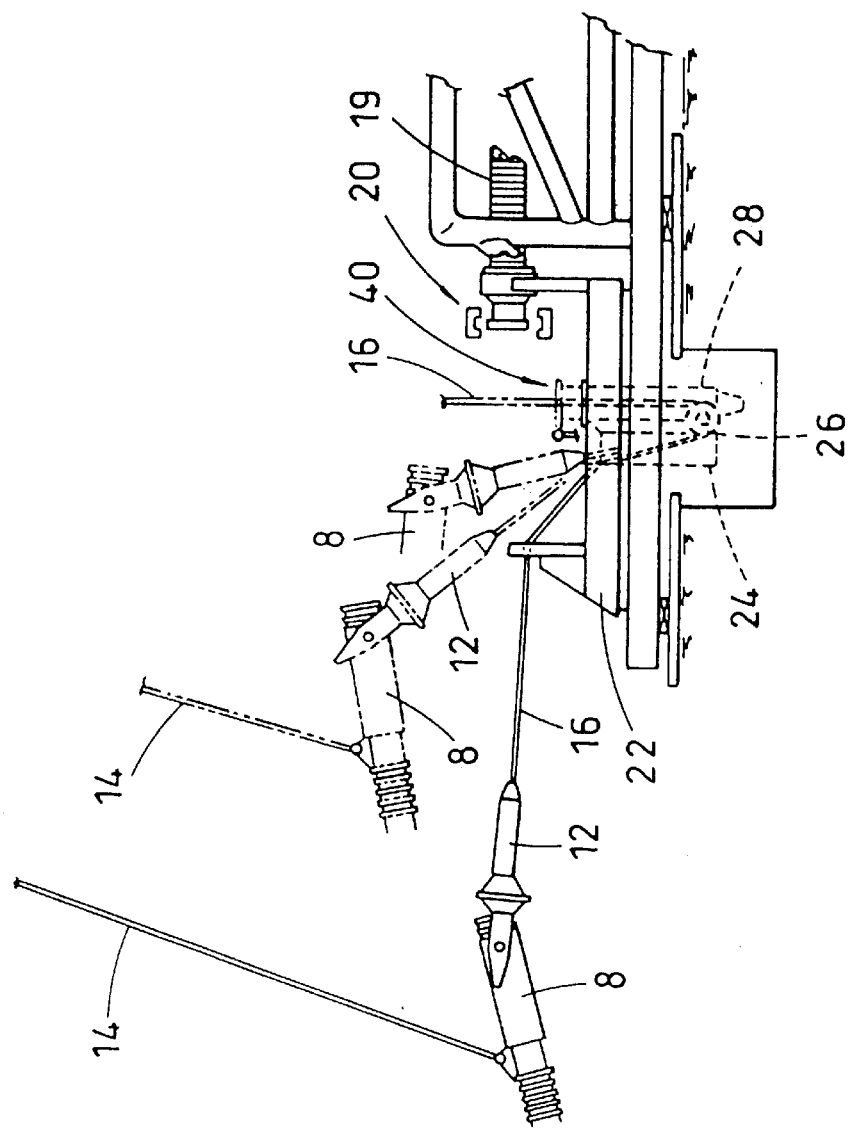
Figure 3A:
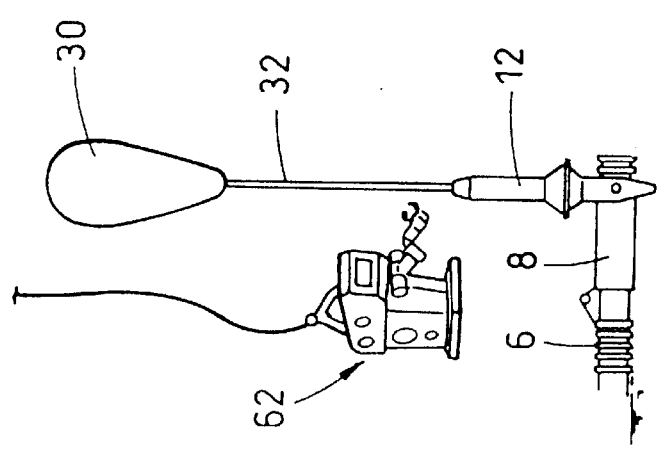

The second end 3 of the second pipeline may for instance before the connection operation is initiated, be situated in resting position on the sea bottom, as shown in FIG. 3a. The terminator 8 is in this situation provided with a closed valve or a piggable termination cap. In the shown embodiment, the terminator 8 is provided with a surrounding both rotatable and axially movable sleeve 7. The throughgoing terminator 8 is at the very end provided with a coupling flange 17 and coupling means 29, as best shown in FIG. 5. On the sleeve 7, positioned on the intermediate part of the terminator 8, is mounted a laterally directed anchor element 10 with a mandril 12. The anchor element 10 is in the shown embodiment realized as a forkshaped member with two arms 9 and 11, which are straddling the terminator 8 and are pivotally connected on either side of the sleeve 7. The anchor element 10 with the mandril 12 are thus both pivotable and axially movable relative to the terminator 8. The mandril 12 is at the outer end of the anchor element 10 provided with means 15 for releasable attachment to a pulling line 16 (these parts shall be described in detail later). At the rear end, the terminator 8 is provided with a support lug 13 for a hoisting line 14. The mandril 12 is further provided with special means for positioning and locking the mandril 12 in a receiving means 24 or first shaft mounted in the template 22 (shall be described later).

The template 22 is provided with a post 22a on which is mounted the coupling means or terminator 20 on the first pipeline 19 in a more or less fixed position. In some applications, it may be desirable to arrange the first pipeline somewhat pivotably about a horizontal axis to facilitate the coupling to the second pipeline. In the same vertical plane as the center axis through the terminator 20 on the first pipeline 19 is in the template provided a receiving means or first shaft 24, which is dimensioned and positioned for receipt and fixation of the mandril 12 on the terminator 8. In the bottom part of the receiving shaft 24 is further arranged a transfer element means such as a sheave 26 for transfer of the pulling line 16, which sheave 26 is utilized during the pull-in of the second pipeline.

In the template 22 is furthermore arranged a second receiving means or second shaft 28 which is used for temporary installation of a special pulling tool 40, provided with said sheave 26 for the pulling line 16. The pulling tool 40 shall be described in detail in the following in connection with FIG. 2 and detail FIG. 4a.

The second shaft 28 in the template 22 for the pulling tool 40 extends parallel with and adjacent with the first shaft 24 for the mandril, and with an opening therebetween for passing of the sheave 26.

Figure 4A:
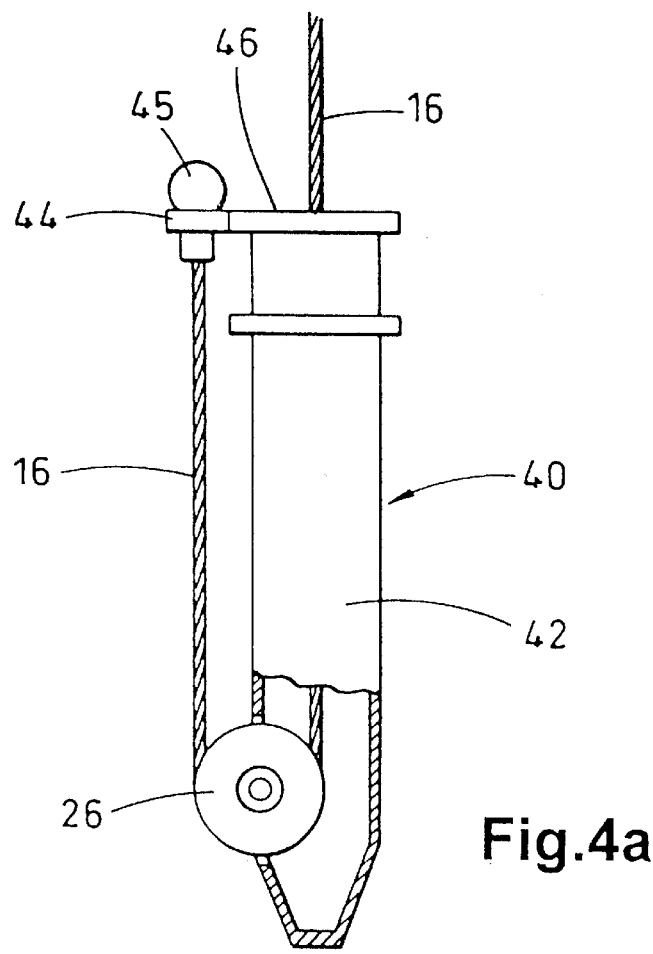
FIG. 4a is a sideview, partly in section, illustrating the design of the coupling tool.

The pulling tool 40 consists of a hollow, pipeshaped body 42, forming a passage for the pulling line 16. The sheave 26 is mounted at the bottom of the tool 40. Before the pulling operation is initiated, the pulling tool with the pulling line 16 is not connected to the template. In FIG. 4a, the pulling tool 40 with the pulling line 16 is arbitrarily shown in a suspended position thereabove. In this situation, the pulling line 16 runs down through the pulling tool 40 around the sheave 26 and up along the outside of the tool 40 to an attachment point 44 at the top of the tool 40. At the very end of the pulling line 16 is provided a fastener, such as a ball 45.

When the pulling operation shall be initiated, the pulling tool with attached pulling line 16 is lowered down, for instance by the use of hoisting equipment on a ROV (not shown) down into the second shaft 28 on the template 22, substantially as illustrated in FIG. 3b.

The sequential steps which constitute the pull-in operation and the fixation of the second pipeline via the terminator 8 in the template, are illustrated in FIGS. 1b, FIG. 3a and 3b.

In FIG. 3a is to the left shown the flexible casing 6 with the terminator 8 on the pipeline, prior to the pulling operation having been initiated. The second pipeline is, as shown, positioned on a sea bottom, and the laterally directed mandril 12 is pointing vertically upwards as shown in FIG. 3a and is thereby easily accessible for the hoisting and pulling equipment. This position can be safeguarded by attaching a line to the outer end of the mandril 12 up to a float 30. When the operation shall be initiated, the pulling line 16 on the pulling tool 40 is positioned in the receiving shaft 28 on the template 22 beside the first shaft 24 for the mandril 12. The pulling line 16 which as previously described runs through the pulling tool sleeve 40 down to the sheave 26 and from there up to the top of the pulling tool sleeve to an attachment point 46 is therefore located as shown in FIG. 4a.

Figure 2:
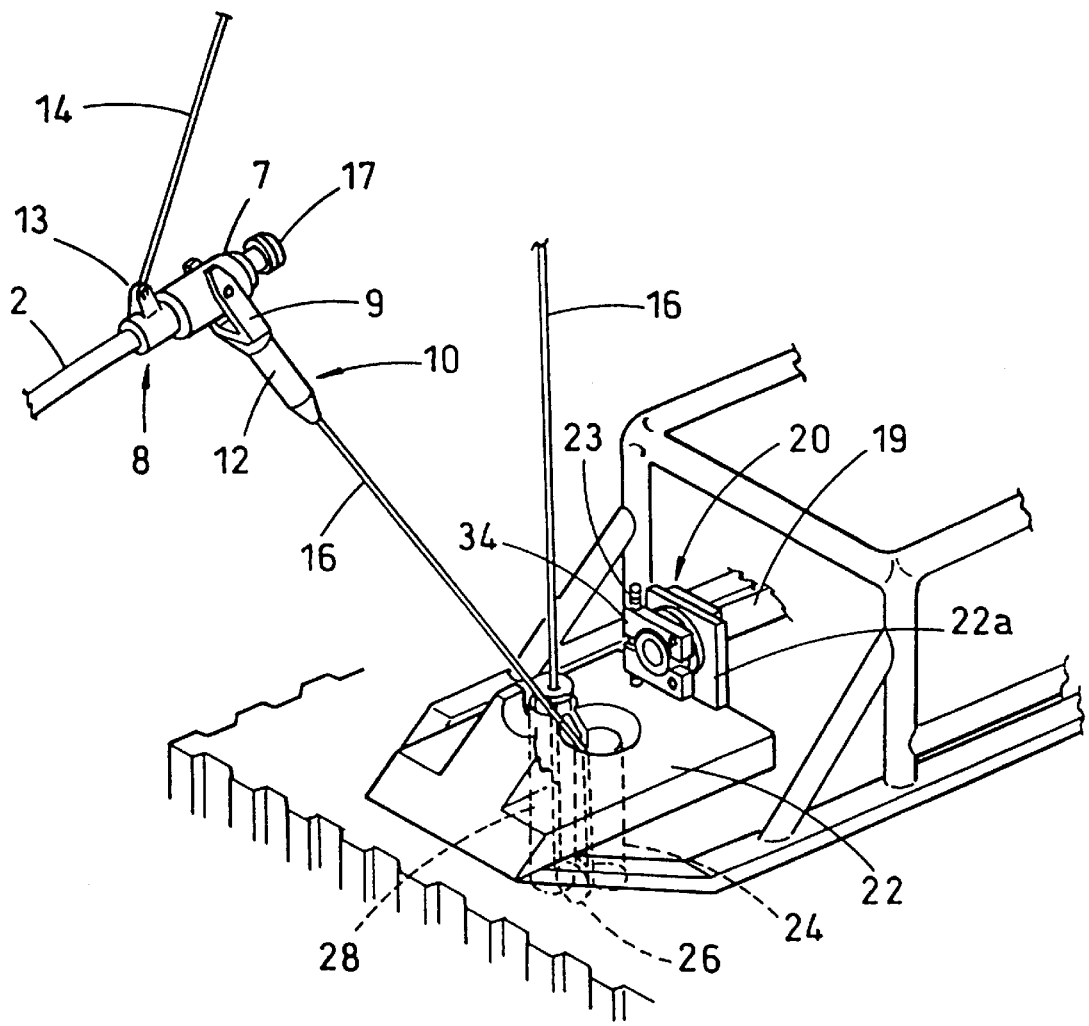

At this point of the description of the pull-in operation, it shall be noted that both the pipeline with the terminator 8 and the pulling tool 40 with the various lines etc. are in the Figures, especially FIGS. 2 and 3a and 3b.

Figure 4B:
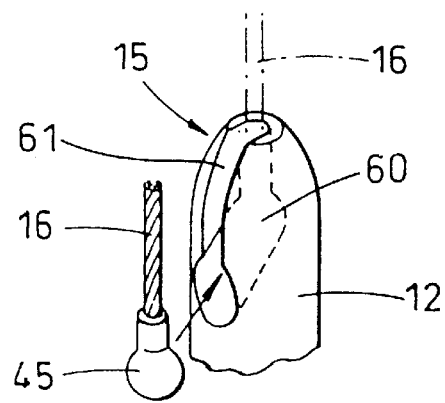
FIG. 4b is a perspective fragmentary view, partly in section, illustrating the outer end of the mandril.
Figure 4C:
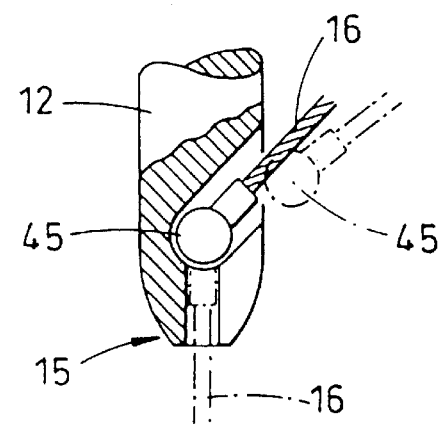
FIG. 4c is a cross-sectional view of the outer section of the mandril.

FIG. 3b shows the pulling tool 40 being lowered down into the complementary second shaft 28 in the template. In this situation, a ball member 45 attached to the end of the hauling line 16 is positioned at the attachment element 44 on the top of the tool 40. The ball 45 is grasped by monitoring means on a ROV, whereafter the pulling line 16 is pulled up and out through the second shaft 28 via the bottom based sheave 26 from where the pulling line extends up to hoisting means on a ROV 62 or the like (not shown). The hauling line 16 is transported over to the complementary attachment point at the end of the anchor element or mandril 12. The mandril 12 is at the end provided with a special attachment means shown in detail on FIG. 4b. The mandril 12 is at the end provided with a lateral, throughgoing passage 60, as shown in detail in FIG. 4b, which passage is provided with a lateral slit 61 from the end down to the passage, thereby providing introduction possibility for the ball member 45 into the passage, and the hoisting line 16 into the passage 60 and the slit 61, respectively. The hoisting line 16 with the ball 45 is guided into position on the mandril 12 by means of suitable tooling on a nearby located ROV 62 (shown on FIG. 3a). Simultaneously, or prior to the beforementioned operation, the float 30 including the line 32 has been removed.

Furthermore, the hoisting line 14 is being attached to the support lug 13 on the terminator 8.

Subsequent to the previously described preliminary preparations having been accomplished, the pull-in operations of the second pipeline can be initiated. These operations are best illustrated in FIGS. 3a and 3b and FIG. 2. By means of the hoisting line 14 attached to the terminator 8 and the pulling line 16 attached at the front end of the mandril 12, respectively, the terminator 8 including the pipeline is partly lifted, partly moved laterally by manipulating the two lines 14 and 16 above the bottom over to the template 22. The terminator will then be kept suspended at a suitable height above the template 22, discontinuing the hoisting movement, simultaneously as the pulling line 16 is pulled in by means of the hoisting means connected thereto. Thereby, the mandril 12 will be pivoted progressively downwards as illustrated in the four successive FIGS. 3a and 3b, and finally be dragged down into the first shaft 24 in the template, simultaneously as the pulling line is passing under the sheave 26 and from there up to the hoisting means on a ROV 62. If the pipelines are located on larger depths, the operations can be simplified by using one or more floats 5 with remotely controlled buoyancy. When the mandril 12 has been pulled down into bottom position in the first shaft 24, the mandril will automatically be locked versus further vertical movement by means of (not shown) remotely controlled lock mechanisms or the like. Thereby, the terminator has been anchored on the template 22. To effectuate that the terminator 8 is positioned angularly correct in the horizontal plane relative to the first pipeline 19, such that the center axis through the terminator will run coaxially with the center axis through the first pipeline 19, the first shaft 24 in the template and the outside of the mandril 12 are provided with cooperating helical elements, such that that when the mandril 12 is pulled down in the shaft 24, it will be forceably angularly adjusted into correct position.

The pull-in of the terminator 8 including the second pipeline can be carried out by means of hoisting equipment on a surface vessel, by means of a ROV 62, or, particularly on larger depths, by means of a remotely controlled winch with a line drum mounted directly on the template 22.

The finalized positioning of the terminator 8 by means of the downwardly pointed anchor element 10 with the mandril 12 in the receiving first shaft 24 on the template 22, is illustrated in FIG. 5. In FIG.5 is shown a footing or saddle 21 in order to obtain a definite position of the terminator 8 on the template 22, both vertically and laterally. However, in many cases the positioning of the footing 21 is not necessary or even desirable, since it is an advantage that the terminator 8 with the backwardly extending second pipeline can extend somewhat downwards, such that the terminator 8 is pointing slightly upwards. Likewise, the complementary terminator 20 on the first pipeline 19 can be arranged such that it can pivot to some extent in a vertical plane.

When the above described pull-in operations have been accomplished, the final interconnection between the second pipeline end 3 and the first pipeline end 25 can be initiated. Before this coupling operation, the pulling line 16 with the pulling tool 40 should preferably be removed from the template 22. Firstly, in order not to hamper the coupling operations, and secondly, because it may be desirable to utilize the pulling line 16 including the pulling tool 40 in connection with further coupling of adjacent or nearby located pipelines.

Release and retrieval of the pulling line together with the pulling tool 40 can, due to a special aspect of the invention, be carried out automatically by means of a special construction of the anchor element 10 or mandril 12 in the receiving first shaft 24 in cooperation with the design of the pulling tool 40. As shown in the detail FIG. 3b, the pulling line 16 is releasably mounted at the outer end of the mandril 12 by means of the special attachment means shown and described in connection with FIG. 3b. When the mandril 12 is pulled all the way down into the receiving first shaft 24, the pulling line 16 will run from the end of the mandril 12 directly over to the sheave 26. Simultaneously, the mandril 12 including the terminator 8 will during the downward movement in the shaft 26 be forceably pivoted by means of the described engagement between screw-threaded elements in the shaft cooperating with complementary knobs on the mandril 12, effecting the mandril 12 to be angularly located such that the opening 60 in the mandril 12 will point directly towards the sheave 26. In this position, with continued pull in the pulling line, the pulling line including the ball 45 will be pulled laterally out from the mandril 12 and instead take position at the sheave 26 on the pulling tool. In this situation, the pulling tool 40 with the pulling line 16 can be hoisted up from the template by suitable hoisting means on the ROV 62, or up to a surface vessel. The attachment ball 45 at the end of the pulling line 16 is now pulled somewhat upwards and is attached at the attachment point 46 at the top of the pulling tool 40. Thereby, the pulling tool including the pulling line 16 are ready for new pull-in jobs.

The above described pull-in operation with a special pulling tool 40 etc. can alternatively be carried out by means of a ROV 62 provided with especially designed winch means with a line drum for the pulling line 16. When the pull-in operation shall be initiated, the ROV 62 including the pulling tool 40 and the pulling line 16 is descended down and positioned directly on the template 22, whereafter the pulling line is released from the pulling tool 40 and transported over to the second pipeline positioned on the sea bottom in order to be attached to the front of the mandril 12.

The pulling line 16 may be extended up to an auxiliary vessel or up to a float, preferably with adjustable buoyancy via an umbilical. When the pulling shall be initiated, the winch is descended down onto the template 22 by its own weight or by means of a ROV 62. Thereafter, the pull-in procedure will proceed substantially as described subsequent to that the tool 40 is positioned in place on the template 22. When the terminator 8 is installed in place in the first shaft 24 in the template, the pulling line including the tool is hoisted up simultaneously as the winch is lifted up by means of a ROV 62 and/or by means of the float 5. Alternatively, the tool 40 with the terminator is stored temporarily on the template in expectation of further pull-in operations in connection with pipelines on the same template or further pipelines in the vicinity.

A substantial advantage of the constructions and systems described above in connection with the accompanying drawings, is that the entire operation and all sequential steps can be carried out by means of remotely controlled equipment, either directly from an auxiliary vessel, or in cooperation with monitoring equipment mounted on one or more ROVs. Furthermore, all operational steps are in the essence easy to carry out. Especially shall be mentioned the advantage that the unattached or loosely stored pipeline or hose which shall be coupled to the bottom based pipeline on a template or the like, is not drawn along the sea bottom but is instead lifted up from the bottom during the entire pull-in operation. Thereby, the necessary force for the pull-in operation and also the risk for damages on the terminator and pipeline is avoided. Furthermore, it is not necessary to provide the template with a manifold or the like with a jig or constructional parts which entirely or partly circumscribe the piping which shall be connected together. This simplifies to a large degree the pull-in and coupling operations.

The pull-in of the second pipeline including the terminator 8 is subsequent to the above described operations finalized, and the second pipeline stands in fixed, axially aligned position on the template 22, as best shown in FIG. 5, such that the coupling means 29 on the terminator 8 is positioned coaxially directly in front of the coupling means 31 on the pipeline 19, mounted on the template in a mounting bracket 23.

A suitable manipulator or coupling tool mounted on a ROV panel supported by a ROV 62 is descended down to a position directly above the coupling zone between the respective pipeline ends 3, 25 (not shown). The coupling tool is suitably provided with two wedged openings or the like which can be positioned on two complementary uprightly pointing spears provided on the forklike arms 9, 11 on the anchor element 10, while the tool on the other side is provided with biasing elements which can be placed on suitable parts on the template construction. This temporarily positioned auxiliary equipment is for the sake of clarity not shown.

FIG. 5 is showing the second pipeline with the terminator 8 in installed position on the template via the anchor element 10, with the mandril 12 in stable position in the shaft 24. The forkline arms 9 and 11 on the anchor element are straddling the support sleeve 7 on the terminator 8, and are pivotally connected with the sleeve via pivots 13a,b, such that the throughgoing second pipeline can undertake both axial and rotational movements inside the sleeve, and can also undergo pivotal movements in the vertical plane about the pivots 13a,b. The latter movements will only be restricted by use of a saddle element 21, based on the template 22 and provided with opposed arms straddling the lower side of the sleeve 7. The first pipeline or pipe section 19 already mounted in the template 22 or forming part of a manifold mounted thereon, is at the end provided with a special support flange 23 connected to supporting elements of the template.

When the final coupling and sealing between the respective pipeline ends 3, 25 shall be accomplished, the maneuvering arms and biasing elements are lowered down and engaged with the coupling flange 29 on the second pipeline to the left, and with the template, for instance via the bracket 23 on the right, operable such that the terminator 8 including the pipeline end 3 is forced towards the flange 21 coupling means 31 on the pipeline 19 mounted in the template 22. The sealing gasket means 77, 80 shown in FIG. 7, is before this operation put into place on the end of the pipeline 19. A special pressure clamp device hereinafter referred to as a clamp chuck 54 with circumferential segments is mounted on the end part of pipeline 19, as shown in FIG. 6. The clamp chuck segments can be moved radially from an inside position to an outer position. During the beforementioned operations, the segments are by suitable means which shall later be described, moved to the outer position, such that the end part of the first pipeline can be moved to the position generally shown in FIG. 7. An elevational view of the chuck clamp is shown in detail in FIG. 6, taken along plane 6—6 in FIG. 5.

The clamp chuck 54 comprises of three circumferentially arranged segments designated with numbers 33, 35, 37, respectively, which are mutually interlinked with two pinch pivots shown on the right side, while the segments 33, 37 are interconnected on the other side by means of a jack screw 57, the lower and upper parts of which are provided with right-hand threads and left-hand threads, respectively, effecting that the clamp segments will be moved towards and from each other upon rotation of the jack screw 57. The jack screw 57 can be operated by a suitable manipulating means mounted on the ROV-mounted tool.

Operation of the clamp chuck 54 via the upwardly pointing jack screw 57 facilitates the entire coupling operation by means of an overhanging manipulating ROV mounted tool.

As shown in FIG. 7, the clamp segments 33,35,37 are provided with inside, double-wedged grooves 39. Upon radial movement of the segments towards the center of the pipelines, the pipeline coupling ends 29, 31 will be pressed axially together and provide a pressure tight seal by means of the interposed sealing rings 77, 80 and 83. However, in replacement of the shown clamp segments system, one can use a so-called "collett connector", wherein is used in replacement of clamping segments a plurality of circumferentially arranged wedged fingers confined inside a collett ring, which is engaged with axially extending jack screws, such that the radial clamping movement is effected by axial movement of the collett ring.

Before clamping the two meeting pipe ends together to provide a pressure tight sealing therebetween, one must position one or more ring shaped sealing members between the end surfaces on the pipe ends. In conventional systems is usually positioned one external sealing ring, having a wedged inside on either side which is facing against complementary shaped descended wedged surfaces on adjacent second pipeline and first pipeline flanges 75a, 75b, as shown in FIG. 7. By radial movements of the clamp segments, the sealing members will be circumferentially stretched and thereby provide the desired sealing.

In accordance with the invention is utilized a further inside sealing ring 80 which in the sealing system will constitute the principal sealing means. The sealing ring 80 is basically given the same shape as the external ring 77. In accordance with the invention is furthermore utilized an intermediate ringshaped element 82 which preferably is given a substantially rectangular cross-section, and on the opposite side faces of which preferably are positioned so-called O-rings which provide a sealing between the ring element and the adjacent flange surfaces.

In a preferred embodiment of this aspect of the invention, the sealing ring 80 is stabilized on the ring element 82 by means of intermediately located tongue and groove elements 83 as shown. An important function of the solution shown is that the outside diameter of the ring element 82 is smaller than the inside diameter on the inside surface 86 of the clamps in mounted, but partly withdrawn, position. Hereby is rendered possible that the sealing ring 80 with the ring element 82 may be replaced without creating any need for removal of the clamp system, since the clamp segments can simply be moved radially outwards by drawing the pivots 39,39 shown in FIG. 6 along the respective slits 39,41, such that the second pipeline flange 75a can be moved axially rearwards as shown by stitched lines 75, whereupon the sealing ring 80 including the ring element 82 can be withdrawn out to the position shown by the letter B in FIG. 7, thereafter removed by means of a remotely controlled tool, while the combined sealing- and positioning ring 77 will remain in place as shown. Replacement sealing elements can now be moved into position, whereafter the pipeline end 3 by means of the tool likewise can be moved forward into correct position, whereafter the clamp segments are moved radially inwards by rotating the jack screw 57, whereby both the external ring 77, the intermediate ring shaped element 82 and the inside sealing ring 80 will be compressed and thereby provide a pressure tight seal between the pipe ends. It will be understood that all constructive details and elements are such designed that both mounting, demounting and replacement of sealing and packing elements can be accomplished without requiring a demounting of the connection otherwise, a fact which is greatly facilitated by the fact that both pipe ends stand completely free without surrounding supporting elements, mounting equipment or the like. Release and removal of the second pipeline from the template can also be carried out very easily, since firstly, the second pipeline coupling as described is disconnected, whereafter the second pipeline with the terminator 8 including the anchor element 10 can simply be lifted directly up and removed from the template.

Use of two separate sealing elements, namely an external combined sealing and positioning ring element, and an internal primarily sealing ring element, renders the possibility to provide an intermediate bleedline 89, the inner end of which opens into a throughgoing slit in the intermediate ring shaped element 82, and the outer end of which ends in a mouth opening in accessible position on the flange 75a on the second pipeline end 3. In this opening can be placed equipment for controlling the tightness of the seal between the pipe ends.

The invention is herein described in connection with a preferred embodiment shown in the accompanying drawings, but it shall be understood that many modifications may be made without leaving the protectional scope of the invention.

I claim:

1. A system for pull-in and intercoupling of first and second pipelines in a subsea position, the first pipeline and the second pipeline initially being freely suspended or having one end positioned on a sea bottom, the system comprising a bottom based manifold frame on which the first pipeline is mounted, the manifold frame having receiving means and associated means; coupling means for providing a pressure and fluid tight coupling between a first pipeline coupling end and a second pipeline coupling end; a hoisting and pulling means connectable to the second pipeline; a terminator and an anchor element for positioning the second pipeline in the receiving means of the manifold frame, such that the coupling end of the second pipeline faces the coupling end of the first pipeline mounted in the manifold frame; means for establishing relative axial movement between the first and the second pipelines to bring the pipeline coupling ends together; means for establishing a fluid and pressure tight coupling therebetween; wherein the terminator is an elongated member, comprising the end part of the second pipeline and is provided with the coupling means at the coupling end; a sleeve member circumscribing the terminator and providing axial displaceable support for the terminator, the sleeve member being provided with a projecting anchor element having an outer end and a top end, the anchor element being fixed to the associated means of the manifold frame and pivotally mounted on the sleeve member about a transverse axis extending therethrough, the anchor element being connected to a pulling cable, and the sleeve member being connected to the hoisting and pulling means attached to the sleeve member on the terminator; and a coupling tool unit lowerable from a sea surface to pull the coupling ends of the first and second pipelines together and establish the pressure tight coupling therebetween.

2. A system according to claim 1, wherein a jack screw operated clamp coupling device is mounted at the coupling end of the first pipeline in the manifold frame, the jack screw in conjunction with the coupling tool unit clamping together the coupling means on the first pipeline and the second pipeline.

3. A system according to claim 1, wherein the anchor element is provided with two mutually spaced forklike arms straddling the sleeve member and is pivotally connected thereto.

4. A system according to claim 3, wherein the anchor element is shaped as a mandril, and the receiving means on the manifold frame includes an open first shaft having a receiving sidewall adapted for receiving the mandril during the positioning operation.

5. A system according to claim 4, wherein the terminator and the anchor element are connected with one hoisting cable and one pulling cable both of which are suspended in independently operating hoisting and supporting means to facilitate the hoisting, transport and positioning operations, and further including at least one buoyant member to assist in the hoisting and support of the second pipeline.

6. A system according to claim 5, wherein the outside surface of the anchor element, and the complementary receiving side wall in the receiving first shaft include mating threads, so that, when the anchor element is being passed into the shaft, the anchor element is rotated about the anchor element axis to attain a preselected angular position.

7. A system according to claim 5, wherein the pulling cable is attached to the outer end of the anchor element and extends to a transfer element mounted in the receiving means and upward to hoisting and monitoring equipment connected to one of an ROV and a surface vessel.

8. A system according to claim 7, wherein an end of the pulling cable is attached to a pulling tool, the pulling tool having an outer end and a bottom end and serving as a guide for the pulling cable, the pulling tool being provided with the transfer element the manifold frame including a receiving means for the pulling tool, the receiving means being located adjacent to the receiving first shaft for the anchor element.

9. A system according to claim 8, wherein the receiving means for the pulling tool includes an open second shaft vertically arranged in the manifold frame adjacent to and parallel with the first shaft for receipt of the anchor element mounted on the terminator.

10. A system according to claim 8, wherein the pulling cable extends downward and around the transfer element at the outer end or at the bottom end of the pulling tool and up to a releasable coupling point at the top end of the anchor element.

11. A system according to claim 8, wherein the outer end of the anchor is provided with an attachment means for automatic release of the pulling cable, when the pulling operation is completed.

12. A system according to claim 11, wherein the pulling cable is connected to a means for automatic releasable attachment which is part of the anchor element, such that, in use, the pulling cable including the pulling tool may be released and hoisted up from the manifold frame when the anchor element has been pulled into the manifold frame and has been lowered down into the first shaft, whereby the anchor element including the terminator is installed on the manifold frame.

13. A system according to claim 1 wherein the coupling means for providing a pressure and fluid tight coupling between the first and second pipelines comprises the respective coupling ends of the first and the second pipelines having outwardly extending flanges, each flange provided with opposed wedged surfaces; a pressure clamp device mounted on the end of the second pipeline which is mounted on the bottom based manifold frame, the pressure clamp device provided with interconnected segments operable to move radially between an outer position with a clearance to the outside surface of the flange of the second pipeline, and an inner position where the clamp segments are straddling the opposed wedged surfaces on the pipeline flanges when moved together; and a sealing member positioned between opposed end surfaces of the pipeline flanges, the sealing member including at least one double wedged section seated in complementary wedged seats at the inside of each of the pipeline flanges.

14. A system according to claim 13, wherein the wedged surfaces are arranged for axial positioning of the pipeline connecting ends during the assembly thereof.

15. A system according to claim 13, wherein the outside surface of the flange on the second pipeline is adapted to receive a combined sealing and positioning ring element which is mounted on the second pipeline flange to provide for axial positioning of the first pipeline upon assembly.

16. A system according to claim 15, wherein a further packing element is positioned between confronting intermediately positioned faces of the pipeline flanges, which packing element is engaged with the adjacent inside wedged packing ring.

17. A system according to claim 16, wherein the packing element communicates with a bleedline leading through the flange body to an externally positioned control valve for testing purposes.

* * * * *